J. L. MAHONEY.
MANUFACTURE OF WATER BOTTLES AND THE LIKE.
APPLICATION FILED JUNE 14, 1911.
1,058,447.
Patented Apr. 8, 1913.
2 SHEETS—SHEET 1.
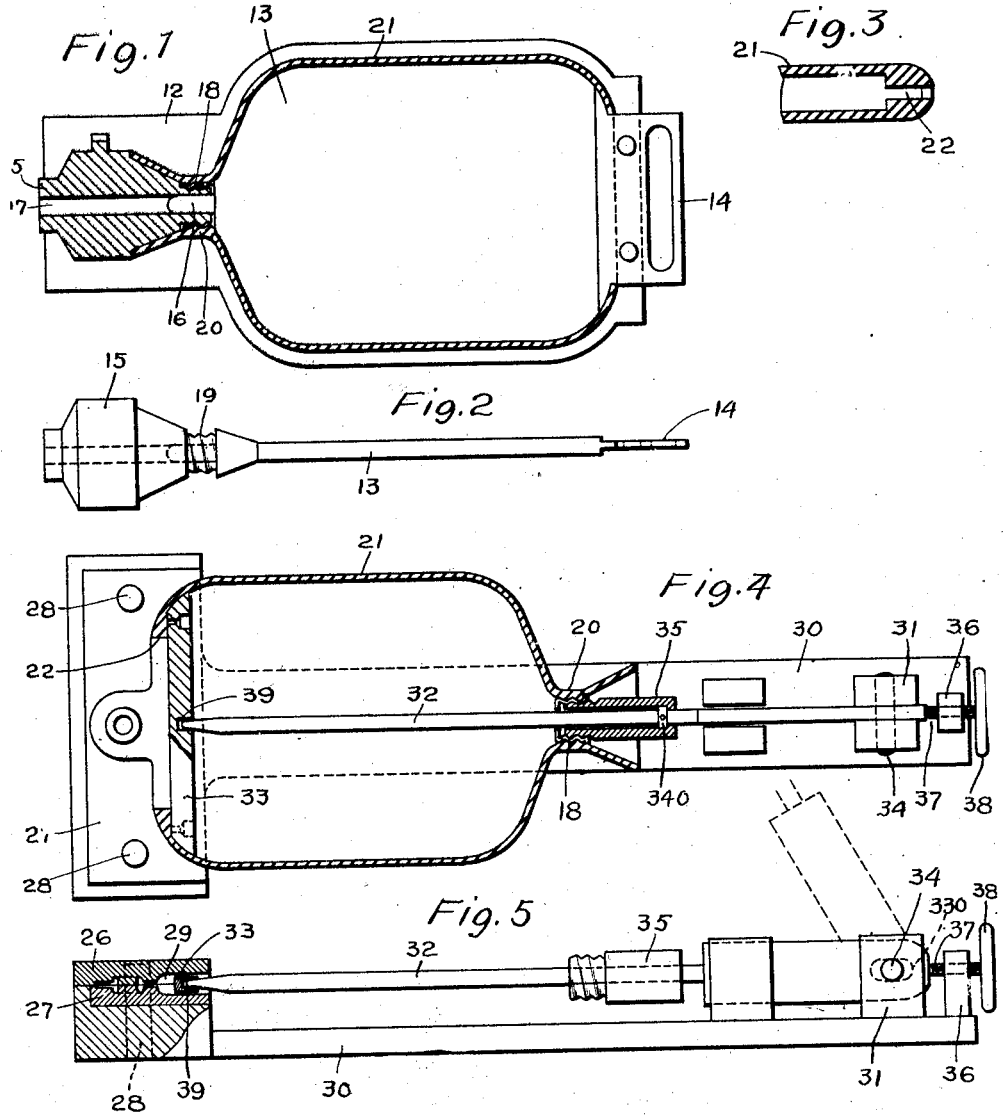
WITNESSES:
H. W. Meade
S. W. Atherton.
INVENTOR
Jemiah L. Mahoney
BY
A. M. Wooster
ATTORNEY

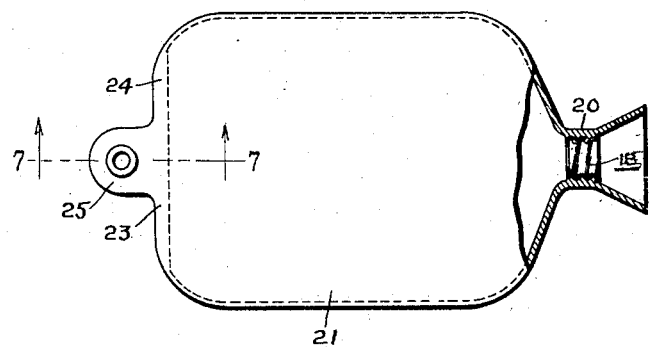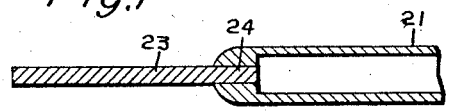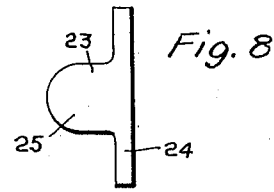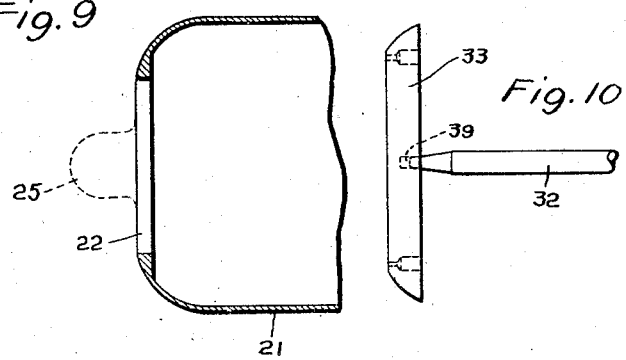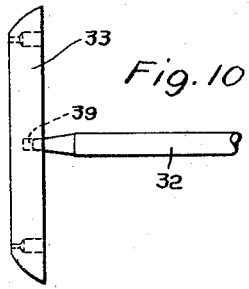

UNITED STATES PATENT OFFICE.

JEREMIAH L. MAHONEY, OF NEW HAVEN, CONNECTICUT, ASSIGNOR OF ONE-HALF TO JAMES A. MURRAY, OF NEW HAVEN, CONNECTICUT.

MANUFACTURE OF WATER-BOTTLES AND THE LIKE.

1,058,447.  Specification of Letters Patent.  Patented Apr. 8, 1913.

Application filed June 14, 1911. Serial No. 633,182.

*To all whom it may concern:*

Be it known that I, JEREMIAH L. MAHONEY, a citizen of the United States, residing at New Haven, county of New Haven, State of Connecticut, have invented an Improvement in the Manufacture of Water-Bottles and the Like, of which the following is a specification.

This invention relates to the manufacture of rubber water bottles or bags and the like and has for its general object the production of such a bottle or bag as a continuous, integral or unitary article without joints or seams, thereby providing a stronger and more durable device of this character having no lines of weakness which may open to produce leakage, and generally improving the same in appearance and serviceability. In accordance with one method of forming bottles or bags of this character, the bottle is molded upon a core or mandrel, thereby forming a body portion which is continuous circumferentially, said core or mandrel being removed through an opening left for that purpose, usually in the bottom of the bottle, said opening being subsequently closed by a cemented joint or by mechanical means such for example, as a gromet. It is one object of the present invention to produce a bottle in which the last mentioned cemented or mechanical joint is dispensed with, the entire bottom of the bottle being continuous and integral with the remainder thereof. These and other objects of the invention, together with means whereby the same may be carried into effect, will best be understood from the following description of one form of bottle and the method of producing the same, reference being had to the accompanying drawings in which:

Figure 1 is a plan view of one part of the mold in which the body portion of the bottle is originally formed, the core or mandrel being shown in place therein and the bottle itself being shown in section. Fig. 2 is a side elevation of the core or mandrel. Fig. 3 is a detail sectional view at right angles to Fig. 1 showing the open bottom of the bottle. Fig. 4 is a plan view, partly in section, of the mold or apparatus for sealing or closing the bottom of the bottle. Fig. 5 is an elevation, partly in vertical section, of the apparatus shown in Fig. 4. Fig. 6 is a plan view, partly broken away, of the completed bottle. Fig. 7 is a section on the line 7—7 of Fig. 6. Fig. 8 is a detail view of the closing or sealing piece. Fig. 9 is a fragmentary sectional view of the open bottom of the bottle showing the sealing piece in dotted lines. Fig. 10 is a plan view of the inner member of the sealing mold and a portion of the supporting arm therefor.

Referring to the drawings, 12 denotes one part of the forming mold, it being understood that there are two of these parts which collectively provide a molding or forming cavity of the size and shape of the exterior of the bottle. Between the parts 12 of the mold there is provided a core which, as usually constructed, comprises a body portion 13, having an extension 14, by which the same is supported and positioned at one end in the mold, and a preferably detachable head 15 by which said core is supported and positioned in the mold at its opposite end. As shown the body portion 13 and head 15 are connected or held in alinement by a projection 16 on said body portion entering a recess or bore 17 in said head. The threaded thimble 18, usually located in the neck of the bottle for securing the stopper in place, is carried by the head 15 which is provided with a threaded shank 19 for this purpose so that in the formation of the bottle the restricted neck portion 20 thereof is molded around said thimble, which is thereby properly located and secured in position.

The operation of forming the hollow bottle upon the core or mandrel by means of mold 12 will, it is thought, be understood by those skilled in the art without further explanation. It will be observed, however, that the body portion 21 of the bottle or bag, as formed, will be continuous or without seams circumferentially, there being left in the bottom, however, a slot or opening 22 (see Fig. 3) formed by the extension 14 of the core. After the completion of the molding operation the part 13 of the mandrel is removed through said opening 22, the sides of the bottle being slightly sprung apart for this purpose, while the separable head 15 is removed by unscrewing the same from the thimble 18.

In order to complete the bottle or bag it is necessary to close the opening 22 and this is done in accordance with the present invention by means of a sealing or finishing piece 23 of unvulcanized rubber which is inserted into said opening and thereafter integrally united with the remainder of the bottle or bag by vulcanization. Said sealing piece 23 preferably comprises a portion 24, which enters the opening 22 and forms a reinforcement for the bottom of the bottle or bag, and a projecting tab 25.

Finishing of the bottle or bag is preferably accomplished by means of a separate sealing or finishing mold, one form of which is illustrated in Figs. 4, 5 and 10. This apparatus comprises a base or frame 30 carrying at one end the outer mold member comprising two sections or plates 26 and 27. The sections 26 and 27 are positioned with respect to each other and to the base 30 by any suitable means, such as dowel pins 28 carried by the end of said frame member and passing through openings in said sections. Said sections are formed with complementary forming cavities 29 which collectively correspond in shape with the exterior of the bottom portion of the finished bottle or bag.

At its end opposite to the outer mold member 26—27 the base 30 is provided with ears 31 to which is pivoted an arm 32 by means of a pin 34 carried by said ears and passing through a slot 330 in said arm. At its opposite end the arm 32 engages the inner member 33 of the finishing mold, said member being in the form of an elongated bar corresponding in form and size to the interior of the bottom of said bottle. The arm 32 as shown is provided with a fixed collar 340 which is engaged by a thimble 35 loosely mounted on said arm and having an end threaded for engagement with the thimble 18.

36 denotes a lug projecting from the end of the frame member 30 and having a threaded opening for the reception of a screw 37 bearing upon the end of the arm 32 and operated by a hand wheel 38.

The upper portion 26 of the outer mold member having been removed and the arm 32 swung on its pivot 34 into an upright position, the inner mold member 33 is inserted into the bottle and the arm 32 is passed through the mouth of the bottle and into engagement with a socket 39 formed in said member 33. The sealing and finishing piece 24 having been inserted into the opening 22, the arm 32 is swung down into the position shown in Fig. 5 and the upper plate 26 of the outer mold member is put into place. In order to hold the bottle as a whole in proper position the thimble 35 is engaged with the thimble 18. The hand wheel 38 is then turned to force the inner member 33 of the mold into close engagement with the walls of the bottle adjacent the opening 22 so that the sides of said opening are tightly clamped between the inner and outer mold members. In this way a molding cavity for the sealing piece 23 is formed between the inner and outer mold members, a part of said cavity being coincident with the opening 22 in the bottom of the bottle, and being limited by the edges of said opening.

The parts being arranged as above described the lower portion of the bottle is vulcanized in any suitable manner thereby uniting the body portion of the bottle and the piece 23 into one integral structure which has been given the desired form by the finishing and sealing mold. After vulcanization the top plate 26 may be removed, the arm swung upwardly and the bottle withdrawn therefrom. The inner member 33 is then removed through the neck of the bottle, the cross sectional area of said member being such as to permit such removal.

The particular apparatus shown and described herein for carrying the invention into effect forms no portion of the present invention, this apparatus constituting the subject matter of another application filed herewith, Serial No. 633,181. It will be seen, however, that the herein described method may be practised by other means than those shown, and that many changes may be made in the article itself and in the various steps by which it may be produced without departing from the spirit and scope of the invention. It will also be seen that while the invention is particularly useful in the manufacture of water bottles, certain features thereof can be utilized to equal advantage in the manufacture of other hollow or cored rubber articles.

Having thus described my invention, I claim:

1. That improvement in the art of manufacturing unitary hollow articles having contracted necks from rubber which consists in molding the body of said article upon a core or mandrel leaving an opening in the wall thereof, removing said core or mandrel through said opening, inserting a mold member through said neck and into engagement with said wall adjacent said opening, inclosing said article in a mold, thereby confining the space adjacent said opening at both the interior and the exterior of said wall, and sealing said opening by vulcanization.

2. That improvement in the art of manufacturing water bottles and the like from rubber which consists in molding the body of said bottle upon a core or mandrel in a mold leaving an opening in the wall thereof through which said core or mandrel projects during the molding operation, removing said core or mandrel through said opening, inserting a mold member through the neck of said bottle and into engagement with said wall adjacent said opening, inclosing said bottle in a second mold, thereby confining the space adjacent said opening at both the interior and exterior of said wall, and, while said space is so confined, vulcanizing a separate piece of rubber in said opening.

In testimony whereof I affix my signature in presence of two witnesses.

JEREMIAH L. MAHONEY.

Witnesses:
  WELLINGTON URE,
  GEORGE R. COOLEY.

Copies of this patent may be obtained for five cents each, by addressing the "Commissioner of Patents, Washington, D. C."